(12) United States Patent  
Kalwa et al.

(10) Patent No.: US 12,257,802 B2  
(45) Date of Patent: Mar. 25, 2025

(54) PRESS PLATEN FOR CREATING DEEP STRUCTURES

(71) Applicant: Flooring Technologies Ltd., Kalkara (MT)

(72) Inventors: Norbert Kalwa, Horn-Bad Meinberg (DE); Torsten Kopp, Ruhner Berge OT Manitz (DE)

(73) Assignee: Flooring Technologies Ltd., Ricasoli Kalkara (MT)

( * ) Notice: Subject to any disclaimer, the term of this patent is extended or adjusted under 35 U.S.C. 154(b) by 809 days.

(21) Appl. No.: 17/311,060

(22) PCT Filed: Dec. 9, 2019

(86) PCT No.: PCT/EP2019/084284  
§ 371 (c)(1),  
(2) Date: Jun. 4, 2021

(87) PCT Pub. No.: WO2020/120417  
PCT Pub. Date: Jun. 18, 2020

(65) Prior Publication Data

US 2022/0024169 A1    Jan. 27, 2022

(30) Foreign Application Priority Data

Dec. 12, 2018    (EP) .................................... 18212021

(51) Int. Cl.  
*B44B 5/00* (2006.01)  
*B30B 15/06* (2006.01)  
(Continued)

(52) U.S. Cl.  
CPC .......... *B30B 15/062* (2013.01); *B44B 5/0052* (2013.01); *B44B 5/026* (2013.01); *B33Y 80/00* (2014.12)

(58) Field of Classification Search  
None  
See application file for complete search history.

(56) References Cited

U.S. PATENT DOCUMENTS 3,380,121 A    4/1968    Chttenden et al.  
5,098,514 A    3/1992    Held  
(Continued)

FOREIGN PATENT DOCUMENTS

DE    102010031421    1/2012  
DE    202012004375    6/2012  
(Continued)

OTHER PUBLICATIONS

International Search Report in related International Application No. PCT/EP2019/084284 dated Feb. 13, 2020, 6 pages.  
(Continued)

*Primary Examiner* — Joshua D Zimmerman  
(74) *Attorney, Agent, or Firm* — Andrew M. Calderon; Calderon Safran & Wright P.C.

(57) ABSTRACT

The disclosure relates to a press plate for creating deep structures in panel-like products, for example in wood-based boards or laminates made of resin-coated papers, composed of a metallic base body, in which strip-shaped and/or frame-like webs, which have a higher thermal conductivity than the base body, are inserted in depressions provided.

18 Claims, 3 Drawing Sheets

(51) Int. Cl.
  *B44B 5/02*   (2006.01)
  *B33Y 80/00*   (2015.01)

(56) References Cited

U.S. PATENT DOCUMENTS

| | | | |
|---|---|---|---|
| 5,494,431 | A | 2/1996 | Telfer |
| 2009/0078129 | A1 | 3/2009 | Cappelle et al. |
| 2010/0247943 | A1 | 9/2010 | Demeyere et al. |
| 2014/0099395 | A1* | 4/2014 | Espe .................. B30B 15/062 216/22 |
| 2015/0158330 | A1 | 6/2015 | Stoffel et al. |
| 2017/0197355 | A1 | 7/2017 | Stoffel et al. |

FOREIGN PATENT DOCUMENTS

| | | |
|---|---|---|
| DE | 102011051266 | 12/2012 |
| DE | 102014010747 | 1/2016 |
| EP | 0292738 | 11/1988 |
| EP | 2127901 | 12/2009 |
| EP | 2186650 | 5/2010 |
| EP | 2380746 A2 | 10/2011 |
| EP | 2380746 A3 | 12/2012 |
| EP | 2991293 | 3/2016 |
| GB | 2276350 | 9/1994 |
| GB | 2380704 | 4/2003 |
| WO | 2018062506 | 4/2018 |

OTHER PUBLICATIONS

Written Opinion in related International Application No. PCT/EP2019/084284 dated Jun. 18, 2020, 7 pages.
Intention to Grant dated Sep. 16, 2024 in EP Application No. 18212021.2 10 Pages.

* cited by examiner

PRESS PLATEN FOR CREATING DEEP STRUCTURES

FIELD OF INVENTION

The invention relates to a press plate for creating deep structures in panel-like products, for example in wood-based boards or laminates made of resin-coated papers (kraft paper).

BACKGROUND

Such a press plate is known, for example, from DE 10 2014 010 747 B4.

In many branches of industry, structured press plates are used as matrices to produce structured surfaces. The press plates are usually steel plates with a thickness of a few millimeters (predominantly 5 mm), which are chrome-plated and polished. In the wood material industry, such press plates are used in so-called short-cycle presses. In these short-cycle presses, synthetic resin-impregnated decorative papers are pressed onto wood-based boards under pressure and temperature. During the pressing process, the synthetic resin melts and cross-links, wherein it partially penetrates into the wood-based board, thereby effectively fixing the synthetic-resin impregnated papers to the wood-based board. The press plate known from DE 10 2014 010 747 B4 can be used to emboss by way of penetration up to the upper side of the wood-based board. However, it is not possible to emboss structures into the wood-based board.

It is also known to press synthetic resin-impregnated decorative papers with phenolic resin-impregnated kraft paper. The laminates produced in this way are then laminated onto carrier boards and are used as worktops or partition walls etc.

EP 2 127 901 B1 discloses a method for producing floor panels that uses a short-cycle press in which the press plate features two webs arranged close to each other in the area with a zone of low pressure for the subsequent further processing of the floor panel and, in addition, individually arranged webs for the simulation of joint filling lines. The areas with the two webs/the individually arranged stamps are repeated at desired intervals. The embossed depressions may have different shapes. The plates can be split into individual boards or tiles after embossing. However, they can always be processed into several connected pieces, so that only a narrow zone of high pressure is necessary for embossing the connected pieces, said zone having a small area. In this case, the entire board or tile surface is described as a zone of low pressure.

The structures on the press plates are usually produced by etching. In a complex process, acid-resistant lacquers are printed onto the steel blanks, the printed image of which corresponds to the later structure. At the points where no lacquer is applied, material is removed during the subsequent etching process. This is not done at points where there is no lacquer. The problem in this case is that it is not possible to achieve arbitrary etching depths with a single etching process. This means that, for deep structures, many etching cycles must be carried out. This renders the production process, as described in EP 2 186 650 B1 for example, long and expensive.

Etching technology can no longer be used from a certain structure depth, as the application of lacquer described can no longer be precisely applied in increasingly deeper structures. Deep structures that are created using etching technology are usually around 200 μm.

A press plate that is used to press impregnates for furniture can easily withstand 70,000 to 100,000 pressings without significant wear. If impregnates that contain corundum are used, the number of possible pressings is reduced to half to one third. If a deep structure is still desired, the number of presses can be halved again until reworking. This not only results in considerable costs, but also requires more plates.

EP 2 921 293 B1 discloses a short-cycle press in which the press plate is equipped with a frame-shaped projection at the edge, which prevents a displacement of the resin of the papers that melts during pressing at the edge of the press plate; this should dramatically reduce the tendency to wear. Pressing causes a flow of resin and without the projection, the melted resin is displaced to the side. If the resin-impregnated papers also contain hard materials, such as corundum, the expansion of the press plates during pressing causes a relative movement between the corundum grains and the press plate, which leads to increased wear.

DE 10 2010 031 421 A1 describes a press with press plates that feature outwardly directed webs. These webs are formed in one piece from the press plate and serve to guide the press plates in labyrinth plates.

DE 20 2012 004 375 U1 discloses a material board with a structured surface in which raised and low-lying areas are configured. The surface is embossed by way of a press plate or endless belt which has a first gloss level over the entire surface and has been given further different gloss levels in several selected areas in further working steps. The gloss levels are created by way of a metallic coating or a mechanical and/or chemical post-treatment.

DE 10 2011 051 266 A1 discloses a compact for producing a laminate and a method for producing a compact. The surface area of the compact that gives it its structure features elevations that are made of a formless material, in particular ink. Depending on the requirement, the elevations can be hardened.

SUMMARY

On this basis, the invention aims to produce a press plate that can be used to emboss especially deep structures, especially in wood-based boards that are to be coated with thermosetting, decorative impregnates. Complex etching processes are to be avoided. For special applications, a simple production option for the press plate is to be created.

To solve this problem, the press plate is characterized by a metallic base body into which strip-shaped and/or frame-shaped webs are introduced in provided depressions, said webs having a higher thermal conductivity than the base body.

This configuration is particularly practical if impregnates that contain corundum are to be embossed with deep structures and/or a special surface, and the press plate has to be reworked relatively frequently due to wear. The areas that are subjected to particularly high stresses are those with which the strips are embossed into the plate. These areas can be replaced if they are not formed in one piece from the press plate, but are formed by inserted webs that can be connected to the plate.

The webs may be positively and/or integrally bonded to the base body. The advantages of a detachable connection with inserted webs become particularly clear when reconditioning the worn plates. The areas responsible for the deep structures are subject to heavy wear, especially when resins containing corundum or overlay impregnates are processed. This means that the stainless steel plates usually used must be reworked in relatively short periods of time.

This design, with the profiling inserted into the basic body, means that the press plates can be quickly reworked because the webs can be removed again and again by milling and replaced by new elements. In particular, glued or soldered webs can be removed from the plate via a sophisticated procedure. It is only necessary to heat the area in which the strip is located above the melting point of the solder or adhesive. Since the press plates are used at temperatures between 190 and 220° C., both the soldering and adhesion must exhibit a heat resistance that is well above 220°. In the case of soldering, the hard soldering method must be applied using silver or brass solder. In the case of adhesion, high-temperature epoxy glues should be used that remain thermally stable above 250° C. In this case, depending on the state of wear, the webs can either be reworked or replaced with new webs.

Due to the higher thermal conductivity of the webs in comparison to the base body, the area in the wood-based board or laminate that is to be deformed is heated through and rendered elastic more quickly. As a result the embossing process can be designed to be much gentler on the material, as excessive heating of the panel-like product is avoided. If the deep structures are embossed in a wood-based board, it prevents the wood material from being excessively heated and the adhesive that coats the wood fibers or wood chips from drying out or being destroyed.

To introduce the webs into the base body, groove-like depressions are preferably milled into the base body, the webs being glued, soldered or welded into said depressions.

The webs can be made of a steel, aluminium, brass or copper alloy. Pure metals, which may also contain alloy elements in the one-percent range, can also be used. Copper, in particular, can be used as a pure metal.

The base body and the webs are preferably chrome-plated; in particular, the edges of the webs facing away from the base body are rounded. The webs can be between 0.2 mm and 5 mm in height. The height is preferably between 1 and 3 mm, in particular 2 mm.

Both the upper side of the webs and the upper side of the base body can comprise a structuring with which, for example, a structure that corresponds to the decorative pattern can be embossed into the surface. The structuring would then represent a wood grain congruous with a wood decorative pattern in order to create a so-called "synchronous pore".

The structure of the base body can deviate from the structuring of the webs if a particular visual design of the upper side of the finished product is desired.

BRIEF DESCRIPTION OF DRAWINGS

Examples of embodiments of the invention will be explained in more detail in the following with the aid of a figure: They show.

DETAILED DESCRIPTION

Figure 1:
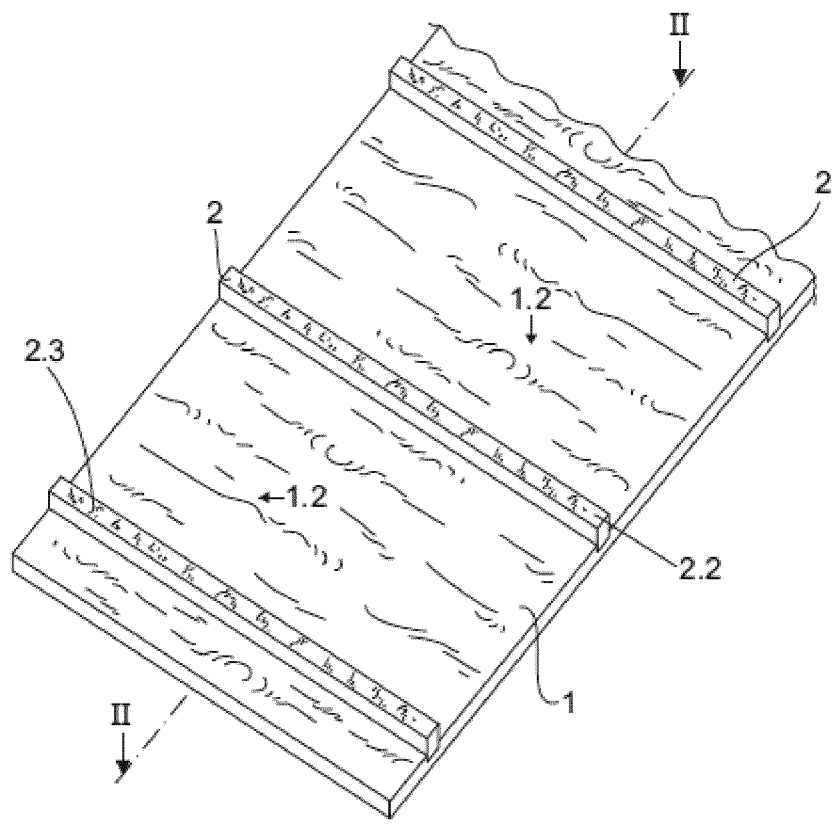
FIG. 1 shows a perspective representation of a first press plate according to the invention.
Figure 2:
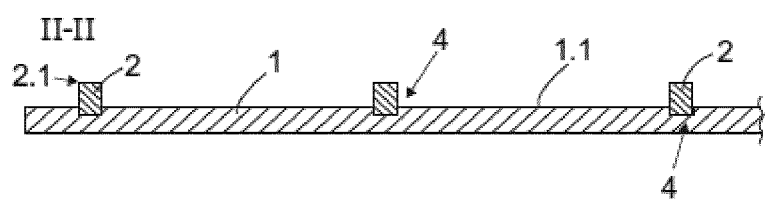
FIG. 2 shows a sectional view along the line II-II according to FIG. 1.
Figure 3:
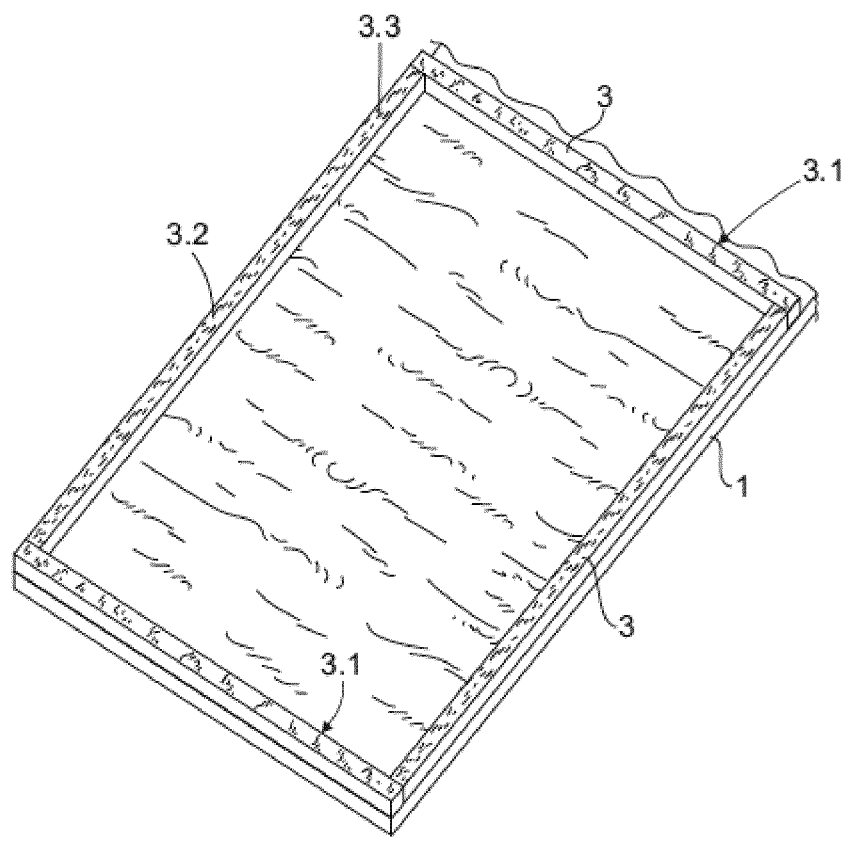
FIG. 3 shows a perspective representation of a second press plate according to the invention.

The press plate is composed of a base body 1 which is, for example, a steel plate with a thickness of 5 mm. Parallel spaced depressions 4 are made in this steel plate, which may have been produced by etching or milling. Groove-like depressions 4 can be provided instead of recesses (holes); however, said depressions cannot extend across the full width of the base body 1. Strip-shaped webs 2 (see FIG. 1) or frame-like webs 3 (see FIG. 3) are introduced into the depressions 4. The webs 2, 3 are made of a material with a higher thermal conductivity than the material of the base body 1. They are preferably made of an aluminium, brass or copper alloy. A steel alloy can also be used. The webs 2 are integrally bonded to the base body 1 in that they are, for example, welded or soldered to the base body 1. The webs 2 may also be glued into the depressions or recesses 4. The upper side 1.1 of the base body 1 features a structuring 1.2 with which a structure that matches the decorative pattern of the wood-based board or laminate can be embossed in the upper side of the platelike product. The upper side 2.2 or 3.2 of the webs 2, 3 may also feature a structuring 2.3, 3.3. The structuring 2.3, 3.3 of the webs 2, 3 may deviate from the structuring 1.2 of the base body 1.

Figure 4:
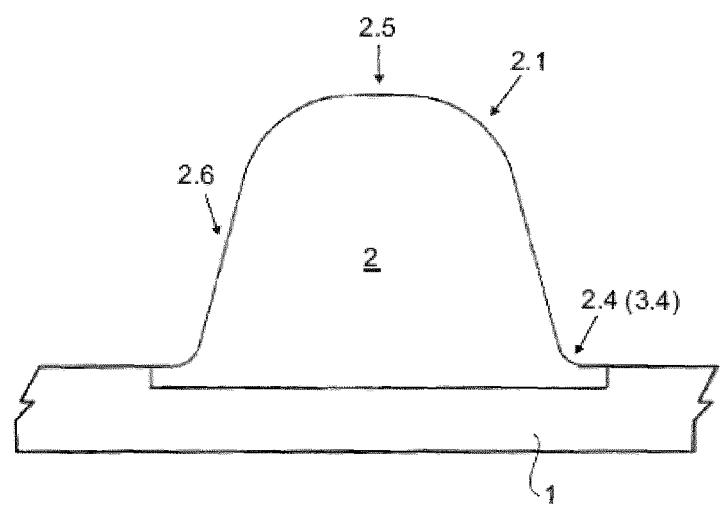
FIG. 4 shows a schematic view of a web inserted into a press plate in a partial representation.

The edges 2.1, 3.1 of the webs 2, 3 facing away from the base body 1 can be rounded in order to render the embossing of the structure easier. As shown in FIG. 4, the transitions 2.4 at the web 2 to the press plate 1 may be rounded so that there is no difference in height from the press plate 1 to the web 2 in the transition area. This rounding can also be present on the frame 3 (not depicted).

The width of the upper area 2.5 of the web 2 is variable. This width depends on how wide the desired depression in the product should be. This width is determined by the saw cut used to divide a large-size panel into individual panels. The slanted flanks 2.6 of the web 2 are formed on the product.

A press plate designed according to the invention was used as follows:

Embodiment Example 1

Two grooves 4 with a width of >20 mm and a depth of <1 mm were initially milled at a distance of 200 mm from each other into a smooth, chrome-plated lab plate (size: 650×500 mm) serving as a base body 1; two chrome-plated metal webs serving as webs 2 were then introduced into said grooves and glued to the steel lab plate using a cyanoacrylate that remains stable at high temperatures. The webs 2, 3 were 2 cm wide and protruded 1 mm above the upper side 1 of plate. They were rounded on one side in the edge region 2.1. They were glued at the non-rounded side to the base body 1. Once the adhesive had hardened, the press plate was installed in a lab press as an upper plate. HDF panels (8 mm, bulk density: 850 kg/m$^3$) were then covered with melamine resin-impregnated decorative papers on the upper side and backing layer impregnates on the underside, and pressed according to the press parameters below. Once cooled, the press depth was determined for the two web-shaped recesses in the upper side of the HDF panels.

| | Structure depth in mm | |
|---|---|---|
| Variant/press parameter | Glued-on webs made of chrome-plated steel (thickness of 1.0 mm) | Glued-on webs made of chrome-plated aluminium (thickness of 1.0 mm) |
| p = 70 bar, T = 180° C., t = 20 sec | 0.45 | 0.65 |
| p = 70 bar, T = 200° C., t = 15 sec | 0.58 | 0.7 |

-continued

| Variant/press parameter | Structure depth in mm | |
|---|---|---|
| | Glued-on webs made of chrome-plated steel (thickness of 1.0 mm) | Glued-on webs made of chrome-plated aluminium (thickness of 1.0 mm) |
| p = 70 bar, T = 200° C., t = 20 sec | 0.6 | 0.83 |

As shown in the table, the use of a metal with a higher thermal conductivity produces significantly better deformation results. This means that, when using a metal with a more effective thermal conductivity, one can work with more moderate press parameters or reduce the thickness of the glued-on webs 2, 3 to achieve the same deformation result.

Embodiment Example 2

A frame 3 with an outer dimension of 350×350×1 mm and a width of 20 mm was milled into the middle of a non-chrome-plated lab plate (size: 650×500×5 mm) that features a wood structure. A steel and aluminium frame 3, which fitted in terms of format into the depression 4 and had a height of 2 mm, was glued into the depression using a cyanoacrylate that remains stable at high temperatures. The frame 3 was rounded in the lower edge region 3.4 so that no difference in height could be perceived in the transition between plate and frame 3 after glueing. Once the adhesive had hardened, the press plate was installed in a lab press as an upper plate. HDF panels (8 mm, bulk density: 850 kg/m$^3$) were then covered with melamine resin-impregnated decorative papers on the upper side and backing layer impregnates on the underside, and pressed according to the press parameters below. Once cooled, the press depth was determined for the two frame-shaped recesses in the upper side of the HDF panels.

| Variant/press parameter | Structure depth in mm | |
|---|---|---|
| | Glued-in frame made of chrome-plated steel (thickness of 2.0 mm) | Glued-in frame made of chrome-plated aluminium (thickness of 2.0 mm) |
| p = 70 bar, T = 180° C., t = 20 sec | 0.45 | 0.69 |
| p = 70 bar, T = 200° C., t = 15 sec | 0.61 | 0.79 |
| p = 70 bar, T = 200° C., t = 20 sec | 0.64 | 0.89 |

As the comparison between embodiment example 1 and 2 shows, the slightly thicker aluminium strip inserted into the plate achieves a better result once again.

Embodiment Example 3

A frame 3 with an outer dimension of 350×350×1 mm and a width of 20 mm was milled into the middle of a non-chrome-plated lab plate (size: 650×500×5 mm) that features a wood structure. A galvanized aluminium frame 3, which fitted in terms of format into the depression 4 and had a height of 2 mm, was inserted into the depression and soldered to the plate. The frame 3 was rounded in the upper edge region 3.1 so that no difference in height could be perceived in the transition between plate and frame 3 after insertion. The press plate was then chrome-plated. It was subsequently installed in a lab press as an upper plate. HDF panels (8 mm, bulk density: 850 kg/m$^3$) were then covered with melamine resin-impregnated decorative papers on the upper side and backing layer impregnates on the underside, and pressed according to the press parameters below. Once cooled, the press depth was determined for the frame-shaped depressions 4 in the upper side of the HDF panels.

| Variant/press parameter | Structure depth in mm Soldered-in frame made of chrome-plated aluminium (thickness of 2.0 mm) |
|---|---|
| p = 70 bar, T = 180° C., t = 20 sec | 0.69 |
| p = 70 bar, T = 200° C., t = 15 sec | 0.81 |
| p = 70 bar, T = 200° C., t = 20 sec | 0.9 |

As the comparison between embodiment examples 2 and 3 shows, no serious difference in structural depth is achieved with the glued-in or soldered-in aluminium strip. Thus, depending on requirements, glued-on or glued-in webs 2, 3 can be used, wherein the process of gluing on should take place before the chrome plating. Better, of course, are webs 2, frames 3 or other geometries that are to simulate inlays, for example, inserted into a milled steel plate and soldered or joined by "arc joining". This makes it possible to create so-called "registered embossing" structures that would otherwise be difficult or costly to produce.

This plate with the inserted webs 2 or frames 3 can then be entirely chrome-plated, wherein if necessary the metal webs, frames 2, 3 etc. can first be prepared by a pretreatment (e.g. galvanizing, anodizing). As metals with high thermal conductivity, aluminium, brass and copper can be considered, with copper being more suitable due to its thermal expansion comparable to steel.

Depending on requirements, consideration can already be given to the required webs 2 and/or frames 3 when manufacturing the press plates. For example, when structuring (etching) the press plate, the structuring can be omitted at the points where a milled web 2 and/or frame 3 is to be located later. These can then be added after structuring and milling. In this case, it is advantageous that the structure of the plate can be adapted to that of the web/frame 2, 3. The webs 2, 3 can have a height of >0.2 to 5 mm starting from the height of the press plate. Of course, the webs 2, frames 3 or other geometries can also be created in the plate using 3D printing.

Such press plates can be used, in particular, for special products. These can be, for example, sheets used for the production of laminate flooring, which are to have a so-called pressed joint or an indicated joint for a tiling decorative pattern in the joint area. In addition, of course, the inserted webs 2, frames 3 etc. can also feature a different structuring than the rest of the plate. It may feature a wooden structure, for example, whereas the inlaid profile could be unstructured.

The invention claimed is:

1. A press plate for creating structures in panel-like products, comprising a metallic base body comprising depressions and strip-shaped and/or frame-like webs structured to contact and press a surface of the panel-like products the strip-shaped and/or frame-like webs comprise a higher thermal conductivity than the base body and are in the depressions of the base body, wherein the webs are integrally bonded with the base body and/or the webs are bonded with the base body.

2. The press plate according to claim 1, wherein the base body and the webs are chrome-plated.

3. The press plate according to claim 1, wherein edges of the webs facing away from the base body are rounded.

4. The press plate according to claim 1, wherein the webs are a steel alloy.

5. The press plate according to claim 1, wherein the webs are an aluminum alloy.

6. The press plate according to claim 1, wherein the webs are a copper alloy.

7. The press plate according to claim 1, wherein the webs are a brass alloy.

8. The press plate according to claim 1, wherein the press plate is chrome-plated.

9. The press plate according to claim 1, wherein an upper side of the webs features a structuring.

10. The press plate according to claim 1, wherein an upper side of the base body features a structuring.

11. The press plate according to claim 10, wherein the structuring of the base body deviates from a structuring on an upper side of the webs.

12. The press plate according to claim 1, wherein the webs have a height (H) of up to 5 mm.

13. The press plate according to claim 1, wherein the webs are welded, soldered or glued to the base body.

14. The press plate according to claim 1, wherein the webs are created in a 3D printing process.

15. The press plate according to claim 1, wherein the press plate creates the structures in wood-based boards or laminates made of resin-coated papers.

16. The press plate according to claim 1, wherein the webs are detachably connected within the depressions of the base body.

17. The press plate according to claim 1, wherein both the base body and the strip-shaped and/or frame-like webs comprise an exposed upper surface which contacts the panel-like products, the exposed upper surface of the base body comprises a structuring which matches a decorative pattern to be embossed onto an upper side of the panel-like product and the exposed upper surface of the strip-shaped and/or frame-like webs comprises a structuring which deviates from the structuring of the metallic base body.

18. The press plate according to claim 1, further comprising a transition between the base body and the strip-shaped and/or frame-like webs, wherein the transition is rounded so that there is no difference in height from the base body to the strip-shaped and/or frame-like webs in the transition.

* * * * *